United States Patent
Wengelski et al.

(10) Patent No.: US 7,025,178 B2
(45) Date of Patent: Apr. 11, 2006

(54) STABILIZING SYSTEM FOR ORIENTING AND ELEVATING A VEHICLE

(75) Inventors: Jason D. Wengelski, Fox Lake, WI (US); Kurt H. Ott, Beaver Dam, WI (US)

(73) Assignee: Actuant Corporation, Glendale, WI (US)

( * ) Notice: Subject to any disclaimer, the term of this patent is extended or adjusted under 35 U.S.C. 154(b) by 145 days.

(21) Appl. No.: 10/672,553

(22) Filed: Sep. 26, 2003

(65) Prior Publication Data

US 2005/0067227 A1    Mar. 31, 2005

(51) Int. Cl.
*B66B 1/00*    (2006.01)
(52) U.S. Cl. ........................................ 187/277; 187/244
(58) Field of Classification Search ................ 187/224, 187/226, 227, 233, 247, 248, 250, 276, 277, 187/413, 203, 207, 210, 213; 254/11, 12, 254/45, 47, 419, 424, 273, 275, 290, 292; 414/564, 610, 613, 628
See application file for complete search history.

(56) References Cited

U.S. PATENT DOCUMENTS

| | | | | |
|---|---|---|---|---|
| 4,741,413 A * | 5/1988 | Kishi | .......................... | 187/244 |
| 5,139,110 A * | 8/1992 | Kishi | .......................... | 187/244 |
| 5,676,385 A | 10/1997 | Schneider et al. | | |
| 5,915,700 A | 6/1999 | Schneider et al. | | |
| 6,318,508 B1 * | 11/2001 | Inoue | .......................... | 187/394 |
| 6,634,461 B1 * | 10/2003 | Baker | .......................... | 187/247 |
| 6,763,916 B1 * | 7/2004 | Green et al. | ................. | 187/277 |
| 2005/0045429 A1 * | 3/2005 | Baker | .......................... | 187/277 |

* cited by examiner

*Primary Examiner*—Jonathan Salata
(74) *Attorney, Agent, or Firm*—Quarles & Brady LLP

(57) ABSTRACT

An automatic hydraulic stabilizing system for a vehicle automatically extends jacks of the vehicle to achieve a level orientation of the vehicle in an automatic mode or a manual mode. After a level orientation is achieved, the system can be operated to further extend the jacks to elevate the vehicle above the initial level orientation in an automatic mode while maintaining the vehicle level. The system can also retract the jacks in an automatic mode while maintaining the vehicle level.

4 Claims, 3 Drawing Sheets

STABILIZING SYSTEM FOR ORIENTING AND ELEVATING A VEHICLE

CROSS-REFERENCE TO RELATED APPLICATION

Not applicable.

STATEMENT CONCERNING FEDERALLY SPONSORED RESEARCH OR DEVELOPMENT

Not applicable.

FIELD OF THE INVENTION

This invention relates to hydraulic stabilizing systems, and in particular to such systems which are used for supporting mobile equipment or machinery while parked.

BACKGROUND OF THE INVENTION

Hydraulic stabilizing systems are well known and typically used for elevating off-road machinery while it is parked. For example, a set of four hydraulic jacks (or six) may be used to elevate a rock crusher which is mounted on a semi-trailer type of frame while the rock crusher is being operated on site. After operation and the rock crusher is to be moved, the jacks are retracted, placing the rock crusher back on its wheels to be moved over the road.

In prior hydraulic stabilizing systems of this type, the jacks were typically manually operated using manually-operable valves. The human operator of the system could use a level on the bed of the machine and operate the valves so as to elevate the respective corners so as to achieve a level orientation. Hydraulic stabilizing systems have also been known to be used in larger motorized recreational vehicles, i.e. in motor homes. These are typically four-jack systems with one jack at each corner of the motor home, and these have been automatically operated with electronic push buttons, so that the operator of the vehicle could either push one button and all four jacks extend to place the vehicle in a level orientation, or one button would be provided for each jack, and a light would come on at each button that needed to be extended further to achieve a level orientation. When it was time to the lower the vehicle, a retract button would be pressed which would retract all the jacks to prepare the vehicle for transportation over the road. Individual cylinder retract buttons could also be pressed, as well as individual cylinder extend buttons, to achieve orientations other than level.

In many types of equipment, it is desirable after the initial level orientation is achieved, to be able to automatically extend the jacks or stabilizers while maintaining the vehicle level, and also to retract them while maintaining the vehicle level. Accordingly, it is an object of the invention to provide such a system.

SUMMARY OF THE INVENTION

The invention provides an automatic hydraulic stabilizing system which includes the functions of known systems plus the functions of an automatic level extend mode and/or an automatic level retract mode. As in the prior art, the system is preferably able to automatically extend the jacks, be it three, four, five, six, or any number of jacks, to achieve a level orientation of the vehicle. The level orientation of the vehicle may preferably be achieved in an automatic mode or a manual mode. After a level orientation is achieved, a system of the invention can further extend the jacks to elevate the machine above the initial level orientation in an automatic mode, while maintaining the vehicle level. Preferably, the system is also capable of retracting the jacks in an automatic mode while maintaining the vehicle level.

These features are desirable as in many pieces of equipment. Not only a level orientation, but also the height at which the level orientation is achieved matters in such equipment. For example, in a rock crusher, conveyors or other pieces of equipment may need to be routed under the rock crusher bed. In addition, in some applications the height of one vehicle bed needs to be matched to the height of another vehicle bed. Another application may be cargo unloading aircraft where a bed must be lifted to the height of a cargo bay of an airplane.

The foregoing and other objects and advantages of the invention will appear in the detailed description which follows. In the description, reference is made to the accompanying drawings which illustrate a preferred embodiment of the invention.

DETAILED DESCRIPTION OF THE PREFERRED EMBODIMENT

Figure 1:
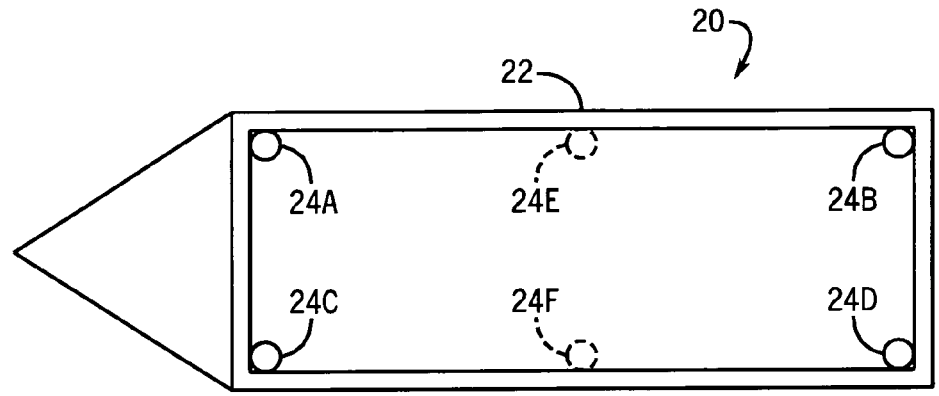
FIG. 1 is a top plan schematic view of a vehicle frame, in this case a trailer bed, showing the location of four stabilizers at the corners of the bed, with an optional two stabilizers (shown in phantom) centered between the end stabilizers on each side of the bed.

Referring to FIG. 1, a vehicle 20 has a frame or bed 22 to which is affixed at its corners a respective stabilizer leg 24A, 24B, 24C and 24D. Along the sides, in between the end stabilizers 24A and 24B and between the end stabilizers 24C and 24D, there may optionally be provided an additional two cylinders 24E and 24F for additional support at those locations, although the remainder of the description will be limited to a four stabilizer system, having the stabilizers 24A–D.

Figure 2:
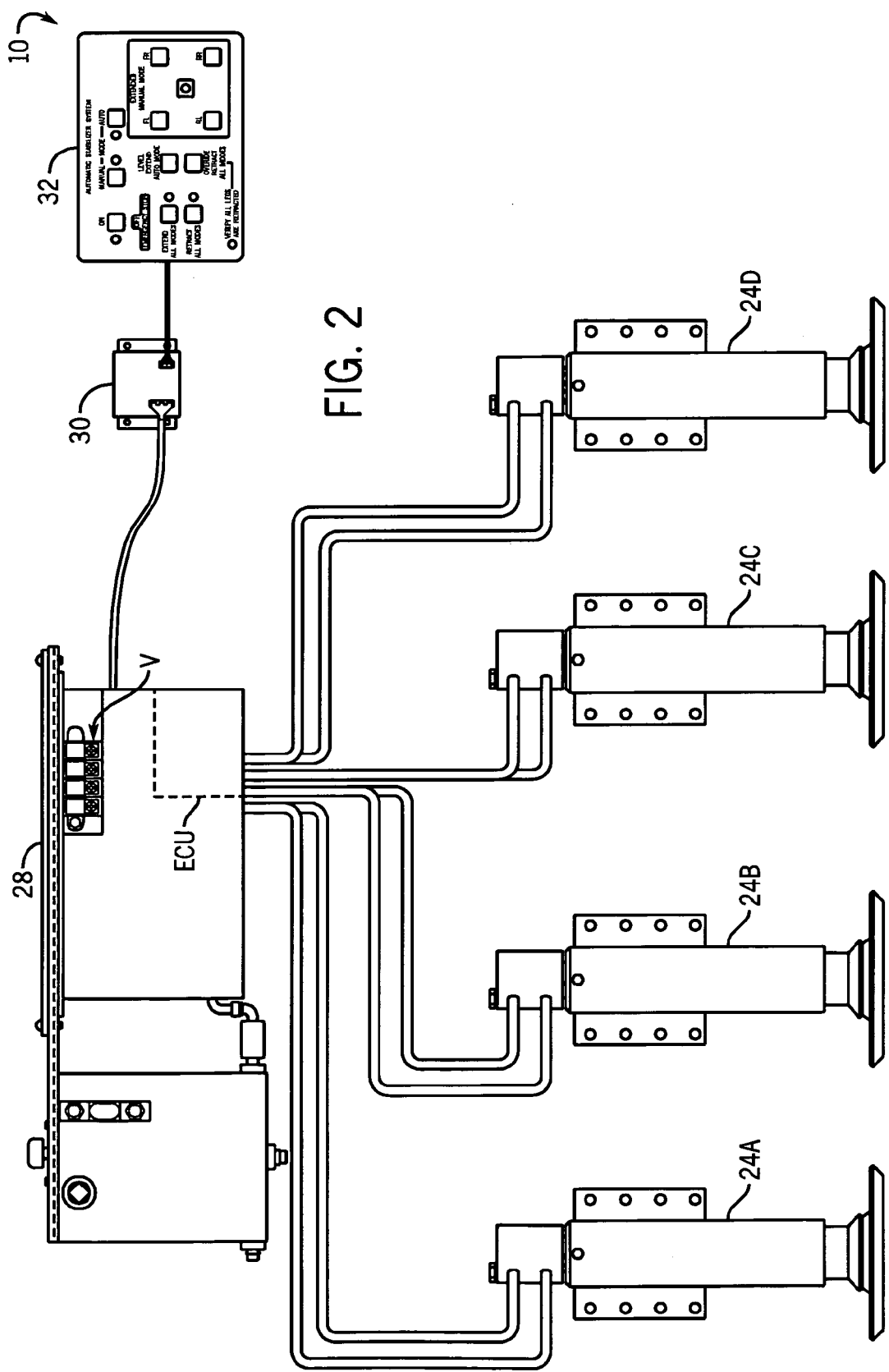
FIG. 2 is a schematic view of the major elements of the system including the stabilizer legs, the control box, the level sensor, and the touch pad.

FIG. 2 illustrates a schematic illustration of a system 10 of the invention including the stabilizer legs 24A–D. Each of the stabilizer legs 24A–D, which are conventional stabilizer legs, includes a hydraulic cylinder which extends and retracts the leg to vary its length, as is well known. Such legs are commercially available, for example, from Power-Packer, an Actuant Company, Milwaukee, Wis.

Figure 4:
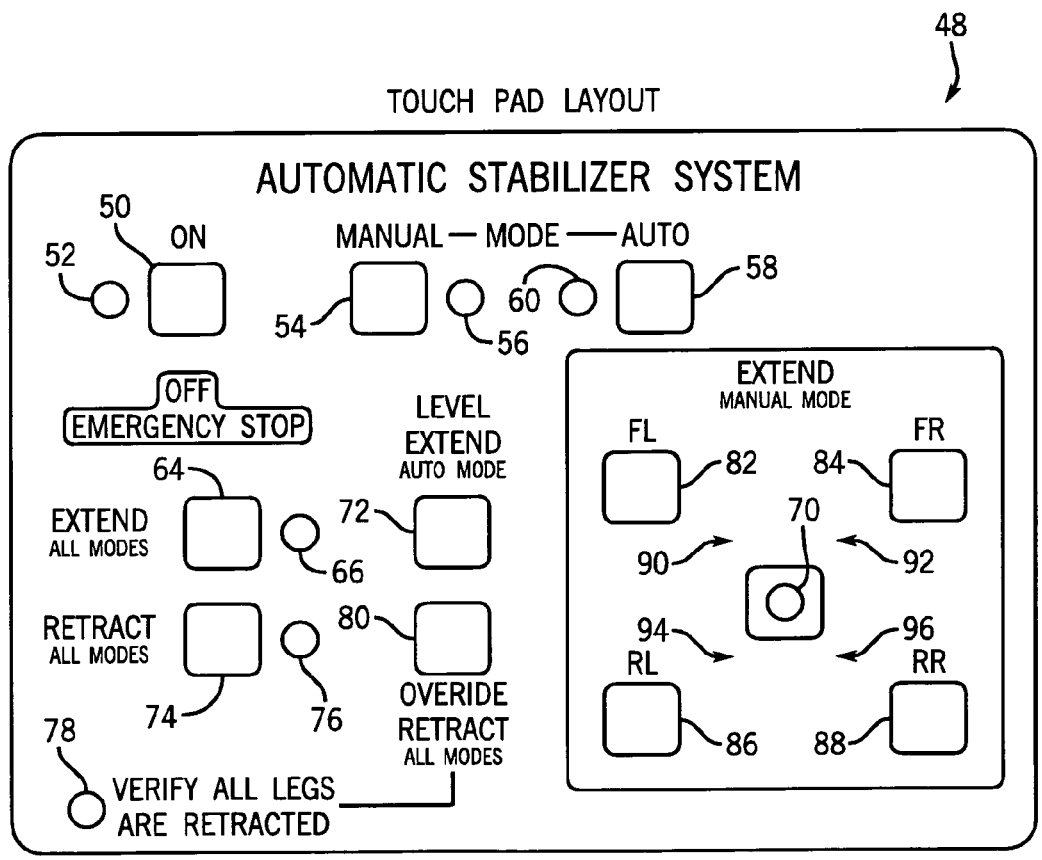
FIG. 4 is a plan view of the touch pad layout for the system.

Each of the legs 24A–D is hydraulically connected by two lines to a hydraulic control box 28, which includes a pump, reservoir, control valves and an electronic control unit (ECU) that receives inputs from a level sensor 30 and a touch pad 32, the touch pad 32 being shown in FIG. 4. The level sensor is any suitable type of level sensor, preferably an electronic sensor as is used in recreational vehicle automatic leveling systems, which is capable of sensing the orientation of a plane in two dimensions, so as to enable achieving a level orientation simultaneously in two dimensions. An electronic control unit (ECU) which is included in the control box is any suitable electronic controller (e.g., a microprocessor based central processing unit) capable of executing the algorithm described below.

Figure 3:
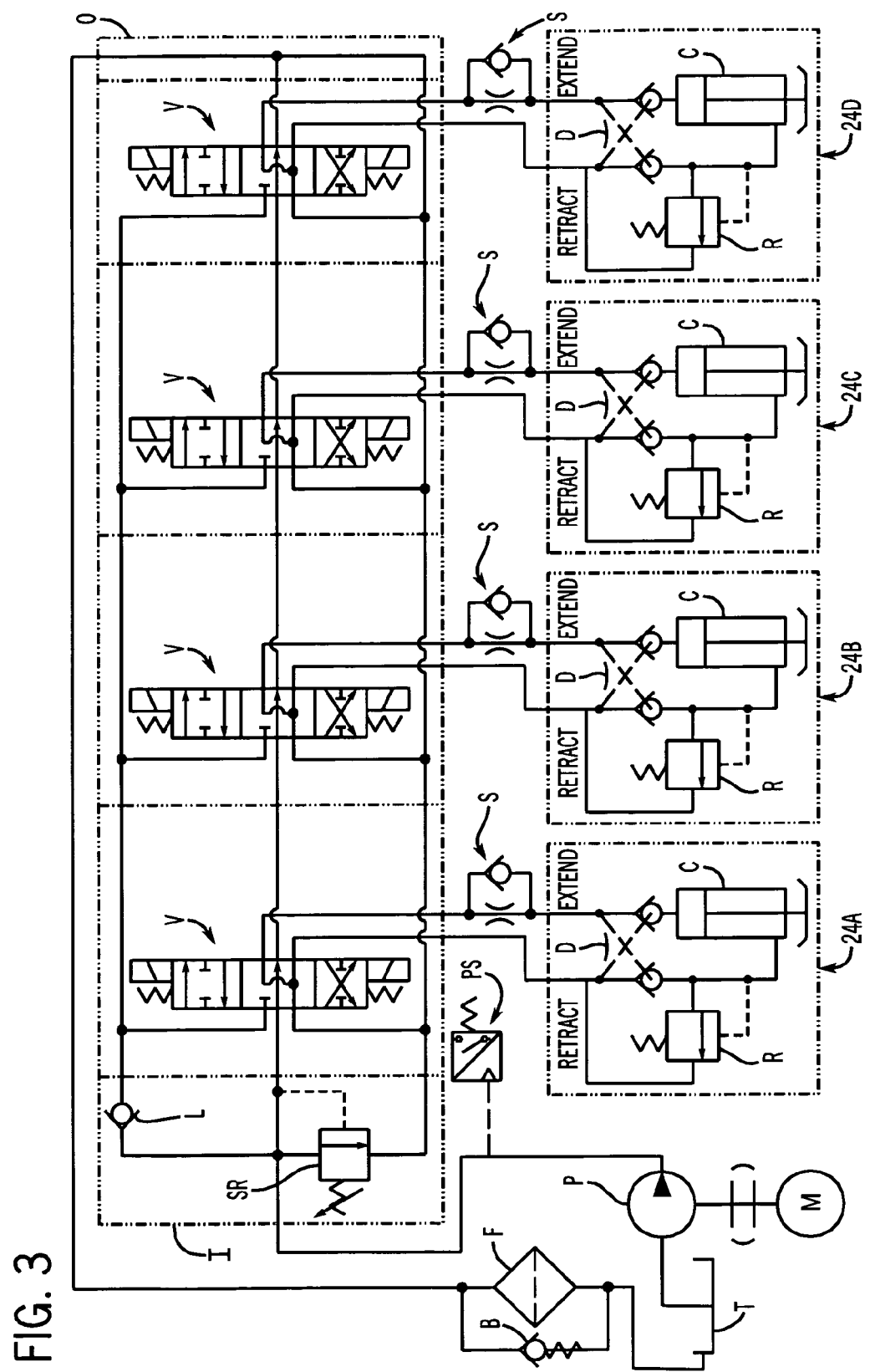
FIG. 3 is an electrohydraulic schematic circuit diagram for the system.

Referring to FIG. 3, each leg 24A–D includes a double acting cylinder C, a pressure relief valve R, and a dual pilot operated check valve D. Valve D requires pressure to be present in the hydraulic line being pressurized in order to release the pressure on the opposite side of the cylinder. This acts as a safety device so that if a line is broken or cut, the cylinder will not move.

Each of the extend lines leading to each of the legs 24A–D also includes a shunt valve S which allows flow past the check valve when extending the legs and slows the flow out the bore side of the cylinder by routing it through an orifice to slow down retraction of the cylinders. The retract lines are connected to the rod sides of the cylinders C as illustrated.

Each of the legs 24A–D is connected to and controlled by a six-way, three-position open center valve V. At the left of the valves V is an inlet valve section I (the left most broken line box) which includes a ball check valve L and the system relief valve SR. A pressure switch PS is also provided which senses full pressure to determine when the legs are fully up or fully down. At the right of the valves V is the outlet valve section O. A filter F and spring biased check valve B are in the outlet or tank line which runs from the outlet valve section O back to tank T. Pump P provides a source of pressurized fluid and is driven by motor M.

The solenoid-operated valves V are controlled by the electronic control unit ECU which is contained in the control box 28. The ECU receives its inputs from the level sensor 30 and the touch pad 32, and is programmed to provide the following operation of the system.

Referring to FIG. 4, the system is turned on by pressing the ON button 50 which lights LED 52. Next, an operator selects either manual mode by pressing button 54 which lights LED 56 or AUTO button 58 which lights LED 60. The operator is able to select between manual or automatic mode anytime during operation. Also, to calibrate the system, in other words, to zero out the controls and calibrate the level sensor to a level orientation, a combination of buttons or a sequence of buttons of the touch pad 48 may be pressed to place the system in calibration mode. The system is programmed to automatically shut off when it has not been used for a period of time, for example, five minutes. The pressure limit of the pressure switch PS is preferably around 2500 psi to notify the controls when the legs have reached their fully extended or fully retracted positions. Upon receipt of this signal, the system will shut off.

To operate the system 10 in automatic mode to extend the stabilizer legs 24A–D, the system is first turned on and the LED 52 will illuminate. Next, the operator presses the AUTO button and LED 60 will illuminate. Following that, the operator presses the EXTEND button 64 which illuminates LED 66 and places the system in an automatic retract mode to confirm that the legs are starting from a fully retracted position. During this time period, the controls will ignore the output of the level sensor so it does not matter if the vehicle is out of level at the beginning of this sequence. When the legs are fully retracted, the pressure switch PS is activated, and the system goes into the automatic extend mode. The output of the pressure switch PS is an input to the ECU. In the automatic extend mode, the ECU will operate the valves V to first extend the front legs to the ground. When motion caused by the legs coming into contact with the ground is detected by the level sensor, the ECU will operate the valves to verify that both front jacks are touching the ground via left/right movement and then the ECU will cease actuating the valves V to stop movement. Next, the rear jacks will be extended to the ground by the ECU operating the valves V. When motion at the rear is detected, both rear jacks will be verified to be touching the ground via left/right movement by the ECU operating the valves V of the left and right rear jacks, and when movement is verified, the ECU will stop actuating the valves V so as to cease movement.

The system will then level the platform of the vehicle utilizing all four legs 24A–D independently as needed. Whichever leg needs to be extended to reach a level orientation of the sensor 30 will be extended until the level orientation is achieved. Upon achieving the level orientation, an LED 70 will be illuminated. If the legs 24A–D reach full extension (preferably on the order of an extension of three feet or more), the pressure switch PS will be activated, and the system will be shut off by the ECU. What has been described in this and the preceding three paragraphs is similar to the operation of prior art automatic leveling systems.

In addition, the system 10 has a level extend feature. Using this feature, an operator can raise the platform to a desired height after the platform has been automatically leveled, and the system remains in the auto (LED 60 illuminated) mode. To "level extend", the operator presses and holds the LEVEL EXTEND button 72. When that is done, all four legs 24A–D will be extended by the ECU controlling the valves V while keeping the platform within a certain specified number of degrees of level, for example within one degree of level. If the legs 24A–D reach full extension and the pressure switch PS is activated, the system will be shut off.

Another feature of the invention is that the legs 24A–D can be operated to retract while maitaining a level orientation (level retract) also. This is done when an operator wishes to reduce the height of the platform while maintaining it level. To operate the system in this mode, the system is turned on by pressing the button 50, which illuminates LED 52, and the AUTO button 58 is pressed illuminating LED 60. Next, the RETRACT button 74 is pressed, which illuminates LED 76. In response, the ECU operates the valves V so as to retract all four legs 24A–D while keeping the platform level within the specified number of degrees, for example, within one degree of level. Eventually, the platform will be placed on its wheels or other supports and will no longer be supported by the legs 24A–D. If while it is so supported, it is within the specified number of degrees of level, for example, one degree of level, the legs 24A–D will continue to retract until they are fully retracted, after which time the pressure switch PS will be actuated to turn off the system. However, if when supported by its wheels or other supports the platform is in an orientation that exceeds one degree from level, the system will only try to retract the leg(s) 24A–D on the high side(s) of the platform, resulting in activation of the pressure switch PS and consequent shutting off of the system while leaving the leg(s) on the low side(s) extended. A red hazard LED 78 will be illuminated in that condition which will signal the operator that the leg(s) are possibly still extended (if the system stops while not in a level orientation). Additional retraction of the legs will only be achieved by the operator depressing the OVERIDE RETRACT button 80 which will place all legs in retract mode. When full retraction of all legs 24A–D is achieved and the pressure switch PS is thereby activated, the system will shut off, holding the legs in the retracted position.

The system also has a manual mode for extending the legs 24A–D. To operate in the manual mode, the system is turned on by pressing the button 50, which illuminates LED 52. Next the MANUAL button 54 is pressed illuminating LED 56 and then the EXTEND button 64 is pressed illuminating the LED 66. All four legs 24A–D can now be extended to the ground and continue lifting the platform as the operator presses individual buttons 82, 84, 86, and 88 for the respective legs 24A–D. Typically, the individual buttons 82, 84, 86, and 88 are depressed by the operator, corresponding to the four legs 24A–D, to extend the needed legs to achieve level. If two or more buttons are depressed at the same time, it will activate two or more legs at the same time accordingly. An LED 90, 92, 94, or 96 will be lit from signals generated by the level sensor 30, to indicate which of the buttons 82, 84, 86, or 88 needs to be pressed to extend the corresponding leg to achieve a level orientation. During the leveling process, the leg(s) whose buttons are being depressed will stop movement when their level condition is achieved but can be overridden by depressing the button again. The operator will need to hold the buttons depressed to perform this operation. It is noted that the EXTEND button 64 will not extend all four legs 24A–D in the manual mode. Operation in this mode is similar to operation of the system described in U.S. Pat. No. 5,676,385 entitled "Semi-automatic Vehicle Leveling System", the disclosure of which is hereby incorporated herein by reference. Upon achieving a level condition, none of the LEDs 90, 92, 94, or 96 will be illuminated and the LED 70 will be illuminated representing level. If during this process one or more legs reach full extension, the pressure switch PS will be activated, and the system will be shut off.

The legs 24A–D can also be retracted in the manual mode. After the system is turned on and the MANUAL button 54 is depressed, the operator presses and holds the RETRACT button 74. All four legs 24A–D will retract while keeping the system within one degree of level. The operator will have to hold the button depressed to perform this operation. If the platform is no longer being supported by the legs 24A–D and it is on terrain such that it has an orientation that is more than one degree out of level, the system will only try to retract the legs on the high side(s) of the platform, resulting in activation of the pressure switch PS and shutting the system off while leaving the leg(s) on the low side(s) extended. The red hazard LED 78 will illuminate, which will signal the operator that the leg(s) are possibly still extended (if the system stops while in a not-level orientation). Additional retraction of the leg(s) will only be achieved by switching to the "manual override retract" mode. When full retraction is achieved and the pressure switch is activated, the system will be shut off.

In the manual override retract mode, the MANUAL button 54 is depressed, followed by depressing the OVERRIDE RETRACT button 80. This is used to retract all the legs 24A–D ignoring the one degree out of level feature. The reason this feature is needed is if the platform is no longer supported by the legs 24A–D and is on terrain that exceeds one degree out of level, the system will only try to retract the leg(s) on the high side(s) of the platform, resulting in activating the pressure switch PS, shutting the system off, and leaving the leg(s) on the low side(s) extended. This feature will be the only way for an operator to retract all legs to their fully retracted position.

A preferred embodiment of the invention has been described in considerable detail. Many modifications and variations to the preferred embodiment described will be apparent to a person of ordinary skill in the art. Therefore, the invention should not be limited to the embodiment described, but should be defined by the claims which follow.

We claim:

1. In a system for automatically extending stabilizer legs of a vehicle to support the vehicle in a desired orientation that is different from the orientation of the vehicle in a parked position when the stabilizer legs are retracted, the improvement wherein the system includes controls that can be actuated to automatically adjust the extension of the stabilizer legs to place the vehicle in the desired orientation, and, once the vehicle is in the desired orientation, can be actuated to automatically adjust the extension of the stabilizer legs to maintain the desired orientation of the vehicle as the vehicle is being elevated to a desired elevation.

2. The improvement of claim 1, wherein the desired orientation is a level orientation.

3. The improvement of claim 1, wherein the system further comprises controls for automatically lowering the platform while maintaining the platform in the desired orientation.

4. The improvement of claim 3, wherein the desired orientation is a level orientation of the vehicle.

* * * * *